Sept. 7, 1965 M. R. D. DUNN 3,204,901
MOTOR VEHICLE EXHAUST PIPE SUPPORT
Filed Nov. 13, 1963 2 Sheets-Sheet 1
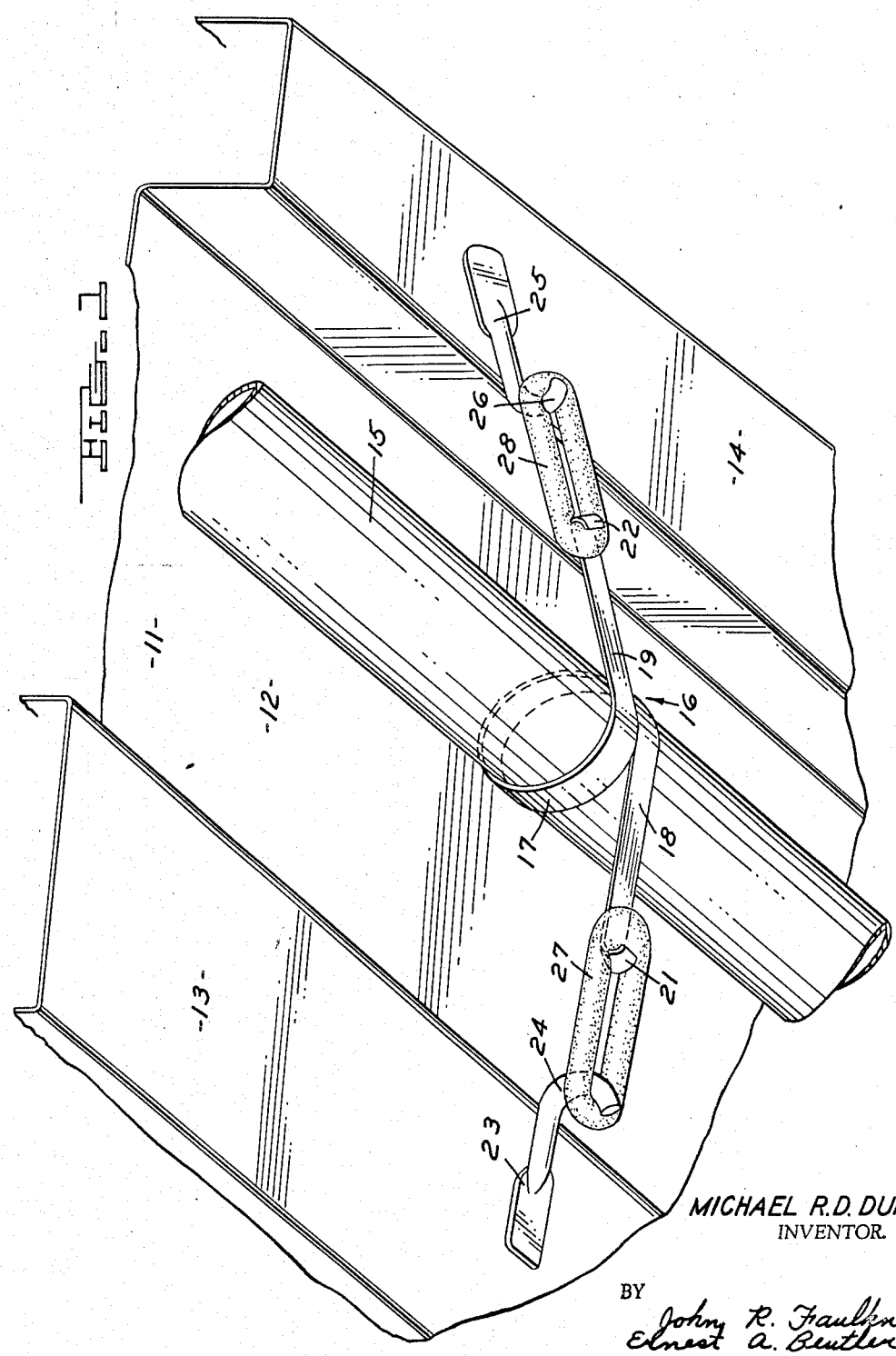
MICHAEL R.D. DUNN
INVENTOR.
BY
John R. Faulkner
Ernest A. Beutler
ATTORNEYS Sept. 7, 1965  M. R. D. DUNN  3,204,901
MOTOR VEHICLE EXHAUST PIPE SUPPORT
Filed Nov. 13, 1963  2 Sheets-Sheet 2
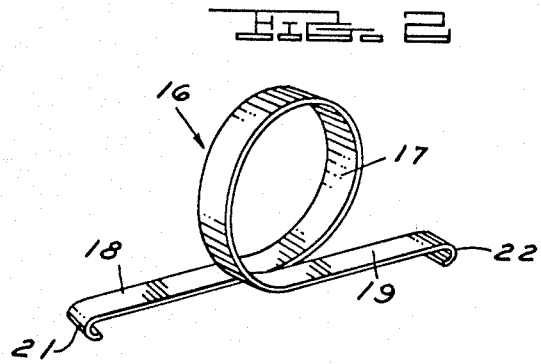
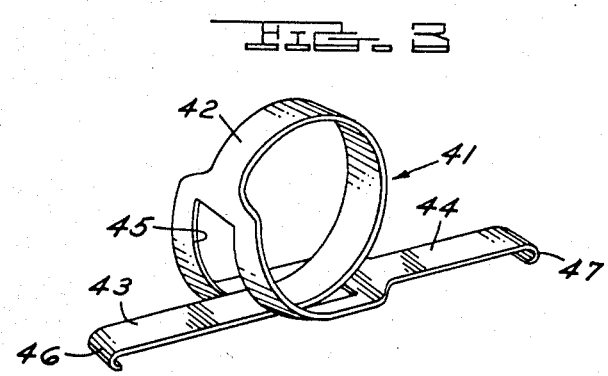
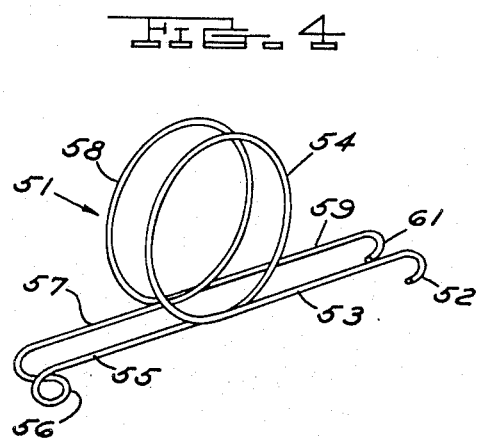
MICHAEL R.D. DUNN
INVENTOR.
BY John R. Faulkner
Ernest A. Beutler
ATTORNEYS United States Patent Office 3,204,901
Patented Sept. 7, 1965

3,204,901
MOTOR VEHICLE EXHAUST PIPE SUPPORT
Michael R. D. Dunn, Coventry, England, assignor to Ford Motor Company, Dearborn, Mich., a corporation of Delaware
Filed Nov. 13, 1963, Ser. No. 323,281
7 Claims. (Cl. 248—74)

This invention relates to motor vehicles and more particularly to resilient supports for the exhaust system of a vehicle engine.

In a motor vehicle it is essential that the exhaust system be suspended from beneath the vehicle with sufficient resilience to preclude the transmission of exhaust noises and vibrations through the vehicle body to the passengers. It has heretofore been the practice to support the exhaust system, consisting of the muffler and exhaust pipe, at a plurality of points along its length by supports that extend upwardly from the exhaust pipe toward the vehicle body or frame. Since it is desirable to maintain maximum possible ground clearance, the distance between the exhaust pipe and the portion of the vehicle extending above the exhaust pipe should be kept at a minimum. In such minimum distances it has been extremely difficult to provide sufficient resilience to attenuate all of the exhaust system noises.

It, therefore, is the principal object of this invention to provide an improved motor vehicle exhaust system support that offers a high degree of resilience without a sacrifice in vehicle ground clearance.

It is a further object of this invention to provide an improved exhaust pipe support that is simple, both to install and to replace.

A motor vehicle embodying this invention includes an engine exhaust system having an exhaust pipe. First and second exhaust pipe supports are affixed relative to the vehicle on substantially diametrically opposite sides of the exhaust pipe. An exhaust pipe clamp encircles the exhaust pipe between the exhaust pipe supports and terminates in first and second end portions that are positioned adjacent the exhaust pipe supports. A first resilient means is connected at its opposite ends to the first exhaust pipe support and the first end portion of the exhaust pipe clamp. A second resilient means is connected at each of its ends to the second exhaust pipe support and the second end portion of the exhaust pipe clamp.

In a first embodiment of this invention, the exhaust pipe clamp comprises a unitary strip of spring steel. In a second embodiment of the invention, the spring steel exhaust pipe clamp is formed with an elongated aperture adjacent one side of the exhaust pipe through which one of the clamp end portions extends. In a still third embodiment of this invention, the exhaust pipe clamp is formed from a unitary piece of steel wire.

Further objects and advantages of this invention will become more apparent when considered in conjunction with the accompanying drawings wherein:

FIGURE 1 is a perspective view of the underside of a portion of a motor vehicle embodying this invention.

FIGURE 2 is a perspective view of the exhaust pipe clamp shown in FIGURE 1.

FIGURE 3 is a perspective view of another embodiment of the exhaust pipe clamp that may be used with this invention.

FIGURE 4 is a perspective view of a still further embodiment of an exhaust pipe clamp that may be used with this invention.

Referring now in detail to FIGURES 1 and 2 of the drawings, there is shown the underside of a portion of a motor vehicle embodying this invention. The motor vehicle has a unitized or frameless construction and comprises a floor pan 11 having a raised tunnel portion 12 bounded at each side by first and second side sill members 13 and 14, respectively. A vehicle driveshaft (not shown) may extend through the tunnel portion 12 along the length of the vehicle. An exhaust pipe 15 of the engine exhaust system is also adapted to extend through the tunnel portion 12.

The exhaust system is adapted to be resiliently supported at a plurality of positions along its length from the vehicle body. Only one of the exhaust pipe supports is shown; however, it is to be understood that any number of the illustrated type of supports may be employed or other types of supports may be used at various positions along the length of the exhaust system.

The exhaust pipe support includes an exhaust pipe clamp, indicated generally at 16 and shown in greater detail in FIGURE 2. The exhaust pipe clamp 16 is formed from a unitary strip of spring steel and includes a generally arcuate intermediate portion 17 that terminates at one side in a first end portion 18 and at the other side in a second end portion 19. It should be noted that the crossover point of the end portions 18 and 19 is positioned below the exhaust pipe 15 and that the end portions extend tangentially away from the exhaust pipe. This permits a greater ground clearance since the exhaust pipe 15 may be supported higher in the vehicle.

The arcuate intermediate portion 17 is preferably formed with a smaller diameter when unstressed than the external diameter of the exhaust pipe 15. The intermediate portion 17 must therefore be resiliently deformed to encircle the exhaust pipe 15 and when so positioned exerts a compressive stress upon the exhaust pipe 15 due to its resilience to retain its axial position thereon.

The first clamp end portion 18 terminates in a downturned hook shaped part 21; and the second clamp end portion 19 terminates in a downturned hook shaped part 22. A first exhaust pipe support 23 having a downturned hook shaped end portion 24 is welded to the underside of the first sill member 13. A second exhaust pipe support member 25 having a downturned hook shaped end portion 26 is welded to the underside of the sill member 14 on the side of the exhaust pipe 15 diametrically opposite to the first exhaust pipe support 23.

A first elastomer ring 27 is received at one of its ends in the hook shaped end portion 24 of the first exhaust pipe support 23. The other end of the first elastomer ring 27 is received in the hook shaped part 21 of the exhaust pipe clamp 16. A second elastomer ring 28 is received in the hook shaped portion 26 of the second exhaust pipe support 25. The other end of the second elastomer ring 28 is received in the hook shaped part 22 of the exhaust pipe clamp 16.

The length of the elastomer rings 27 and 28 is such that when positioned in the assembled condition shown in FIGURE 1 a tensile stress is exerted upon them. The tensile stress of the elastomer rings 27 and 28 exerts diametrically opposing forces upon the end portions 18 and 19 of the exhaust pipe clamp 16. The diametrically opposing forces cause an additional compressional stress to be exerted by the intermediate portion 17 upon the exhaust pipe 15 and serves as a further locating force upon the clamp. The elastomer rings 27 and 28 further sufficient resilience to attenuate all exhaust system noises.

Turning now to FIGURE 3, another embodiment of an exhaust clamp that may be used in the support system shown in FIGURE 1 is indicated generally by the reference numeral 41. The clamp 41 is formed from a unitary strip of spring steel and includes an arcuate intermediate portion 42 that is preferably formed with a lesser unstressed diameter than the external diameter of the exhaust pipe 15 so that it must be resiliently expanded to receive the exhaust pipe 15.

The intermediate portion 42 terminates in the first end portion 43 and a second end portion 44 that overlap at the lower side of the exhaust pipe 15. On one side of the exhaust pipe 15, the intermediate portion 42 and part of the second end portion 44 are formed with an elongated aperture 45 through which the first end portion 43 extends. The first and second end portions 43 and 44 are formed with downturned hook shaped parts 46 and 47, respectively, that are adapted to receive the elastomer rings 27 and 28 as shown in FIGURE 1.

A still further embodiment of an exhaust pipe clamp that may be used in the exhaust support system show in FIGURE 1 is shown in detail in FIGURE 4 and identified by the reference numeral 51. The exhaust pipe clamp 51 is formed from a unitary piece of steel wire terminating at one end in a hook shaped part 52 that extends into an end portion 53. The end portion 53 joins an arcuate intermediate portion 54 that is adapted to extend around the exhaust pipe 15 and terminates in an end portion 55 that extends away from the exhaust pipe 15 on a side diametrically opposite to the end portion 53. The end portion 55 extends into a downturned hook shaped part 56 that terminates in another end portion 57 that extends parallel to the end portion 55. The end portion 57 joins an arcuate intermediate portion 58 that is formed with the same diameter as the intermediate portion 54 and is also adapted to receive the exhaust pipe 15 therein. The other side of the intermediate portion 58 terminates in an end portion 59 having a downwardly extending hook shaped part 61.

As in the previous embodiments, the unstressed diameters of the intermediate portions 54 and 58 is less than the external diameter of the exhaust pipe 15 so that the intermediate portions 54 and 58 must be resiliently deformed to receive the exhaust pipe 15. Also, as in the previous embodiments, the hook shaped parts 52 and 61 are adapted to receive the resilient ring 28 and the hook shaped part 56 is adapted to receive the resilient ring 27.

It is to be understood that, although this invention is shown in conjunction with a unitized vehicle wherein the exhaust pipe supports 23 and 25 are welded to the body sill members, the invention may be utilized with frame type vehicles or the exhaust pipe supports may be secured to any portion of the vehicle underbody. It is preferred, however, to secure the exhaust pipe supports to a substantially rigid member of the vehicle body or frame so that vibrations will be isolated from the vehicle passengers.

Further changes and modifications may be made without departing from the spirit and scope of the invention as defined by the appended claims.

I claim:
1. In a motor vehicle, an engine exhaust system including an exhaust pipe, first and second exhaust pipe supports affixed relative to said vehicle on substantially diametrically opposite sides of said exhaust pipe, an exhaust pipe clamp encircling said exhaust pipe between said exhaust pipe supports, said exhaust pipe clamp terminating in a first end portion extending tangentially away from said exhaust pipe toward said first exhaust pipe support and a second end portion extending tangentially away from said exhaust pipe toward said second exhaust pipe support, first resilient means connected at one end to said first exhaust pipe support and at its other end to said first end portion, and second resilient means connected at one end to said second exhaust pipe support and at its other end to said second end portion.

2. In a motor vehicle having a floor pan, an engine exhaust system including an exhaust pipe, first and second exhaust pipe supports affixed relative to said vehicle floor pan on substantially diametrically opposite sides of said exhaust pipe, an exhaust pipe clamp comprised of a resilient band encircling said exhaust pipe and terminating in first and second integral end portions extending tangentially from said exhaust pipe and positioned adjacent said first and second exhaust pipe supports, respectively, first resilient means connected at one of its ends to said first exhaust pipe support and at its other end to said first end portion to form a more resilient elongation of the latter, and second resilient means connected at one of its ends to said second exhaust pipe support and at its other end to said second end portion to form a more resilient elongation of the latter, said resilient means being under a tensile stress when connected to said exhaust pipe supports and said end portions to exert diametrically opposing forces upon said end portions and a resulting compressive force by said resilient band upon said exhaust pipe.

3. A motor vehicle as defined by claim 2 wherein said exhaust pipe clamp is formed from a single strip of spring steel.

4. A motor vehicle as defined by claim 2 wherein said exhaust pipe clamp is formed from a single piece of steel wire.

5. A motor vehicle as defined by claim 2 wherein said exhaust pipe clamp is formed from a single strip of spring steel having an elongated aperture extending along a portion of its length on one side of said exhaust pipe and said second portion extends through said elongated aperture.

6. In a motor vehicle having a floor pan, an engine exhaust system including an exhaust pipe extending beneath said floor pan, first and second exhaust pipe supports affixed relative to said vehicle floor pan on substantially diametrically opposite sides of said exhaust pipe, an exhaust pipe clamp comprised of a resilient band having an intermediate portion encircling said exhaust pipe and having first and second integral end portions extending tangentially from said exhaust pipe, said end portions terminating adjacent said first and second exhaust pipe supports, respectively, said intermediate portion being generally arcuate in shape and having a lesser diameter than the external diameter of said exhaust pipe whereby it must be resiliently deformed to receive said exhaust pipe, first resilient means connected at one end to said first end portion to form a more resilient elongation of the latter and at its other end to said first exhaust pipe support, and second resilient means connected at one of its ends to said second end portion to form a more resilient elongation of the latter and at its other end to said second exhaust pipe support, said resilient means being under a tensile stress and exerting diametrically opposing forces upon said end portions and a resulting compressive force by said intermediate portion upon said exhaust pipe.

7. In a motor vehicle, an engine exhaust system including an exhaust pipe, first and second exhaust pipe supports affixed relative to said vehicle on substantially diametrically opposite sides of said exhaust pipe and terminating in hook shaped end portions, an exhaust pipe clamp comprised of a resilient band encircling said exhaust pipe and terminating in tangentially extending integral first and second hook shaped end portions positioned adjacent the hook shaped end portions of said first and second exhaust pipe supports, respectively, a first resilient band engaged in the hook shaped end portion of said first exhaust pipe support and said first hook shaped end portion of said exhaust pipe clamp, and a second resilient ring received in the hook shaped portion of said second exhaust pipe support and said second hook shaped end portion of said exhaust pipe clamp.

References Cited by the Examiner

UNITED STATES PATENTS

| | | | |
|---|---|---|---|
| 813,033 | 2/06 | Bellamy | 248—316 X |
| 821,833 | 5/06 | Shaffner | 248—74 |
| 916,673 | 3/09 | Clawson | 248—74 |
| 1,187,587 | 6/16 | White | 248—60 |
| 2,084,243 | 6/37 | Charles | 248—102 |
| 2,109,500 | 3/38 | McAneny | 24—20 |
| 2,359,452 | 10/44 | Summers | 248—104 |
| 2,744,706 | 5/50 | Gerdy | 248—60 |

FOREIGN PATENTS

| | | |
|---|---|---|
| 993,723 | 7/51 | France. |
| 827,505 | 2/60 | Great Britain. |

CLAUDE A. LE ROY, *Primary Examiner.*